Dec. 14, 1937.  E. J. BECK ET AL  2,102,351
SEAT BACK
Filed May 22, 1935  2 Sheets-Sheet 1
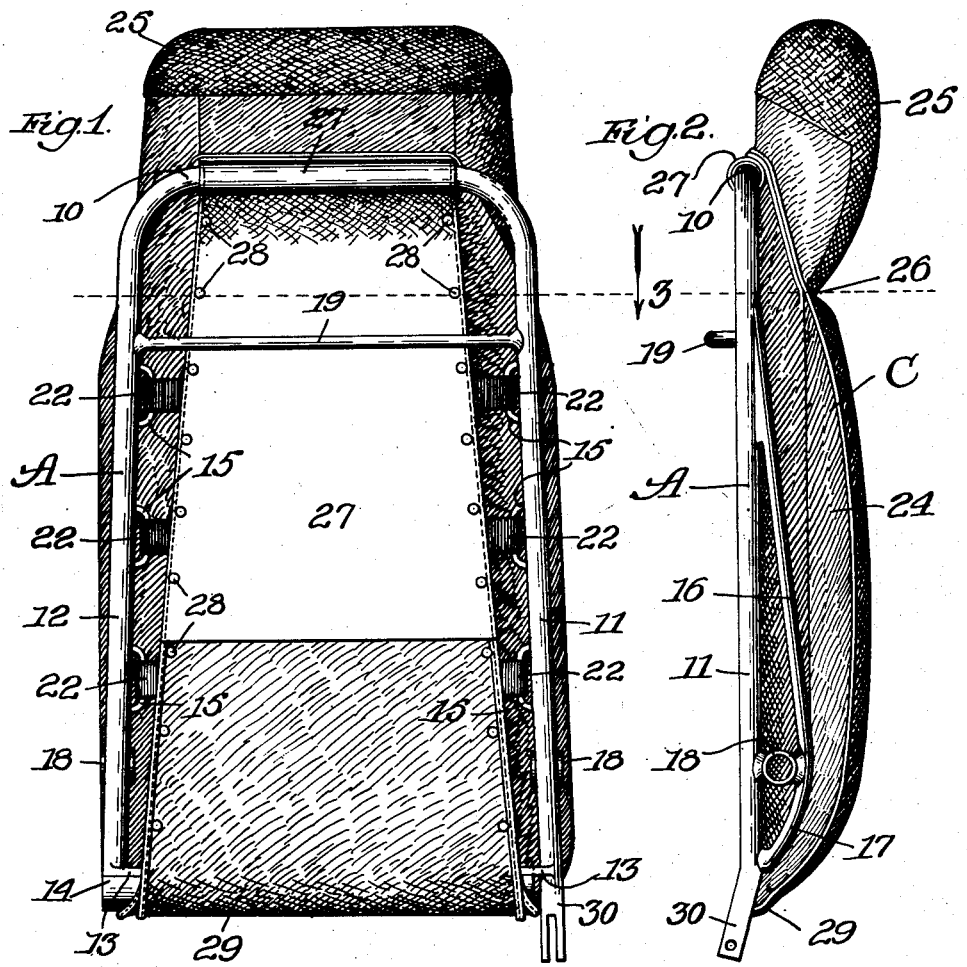
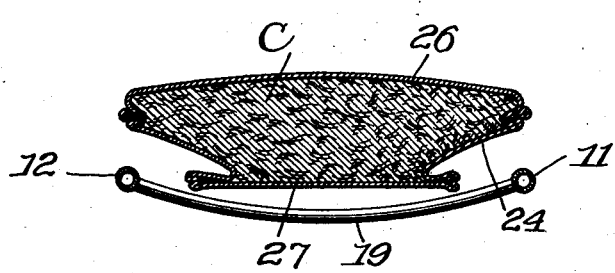
Inventors
Ernie J. Beck and
William B. Schroeder,
By Dyrenforth, Lee, Chritton & Wiles,
Att'ys Dec. 14, 1937. E. J. BECK ET AL 2,102,351
SEAT BACK
Filed May 22, 1935 2 Sheets-Sheet 2
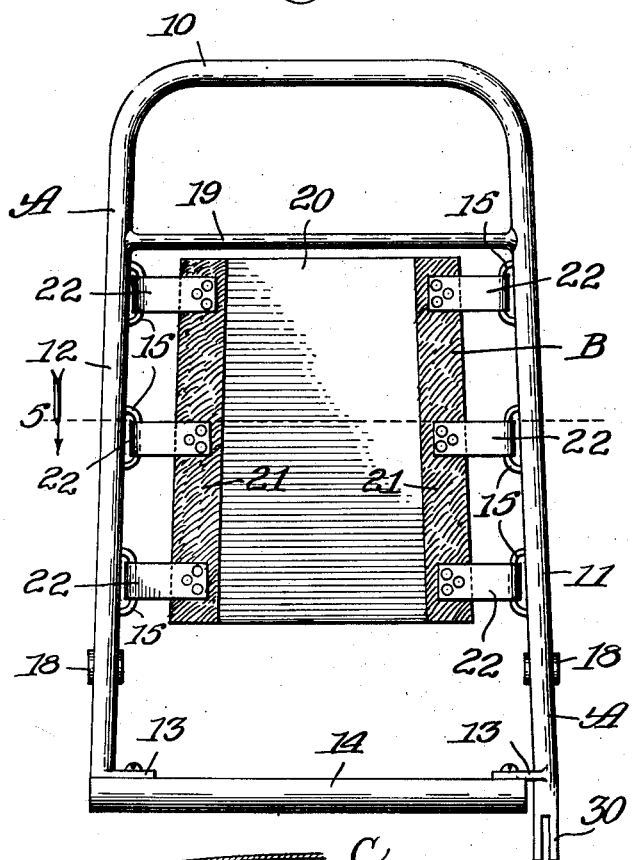
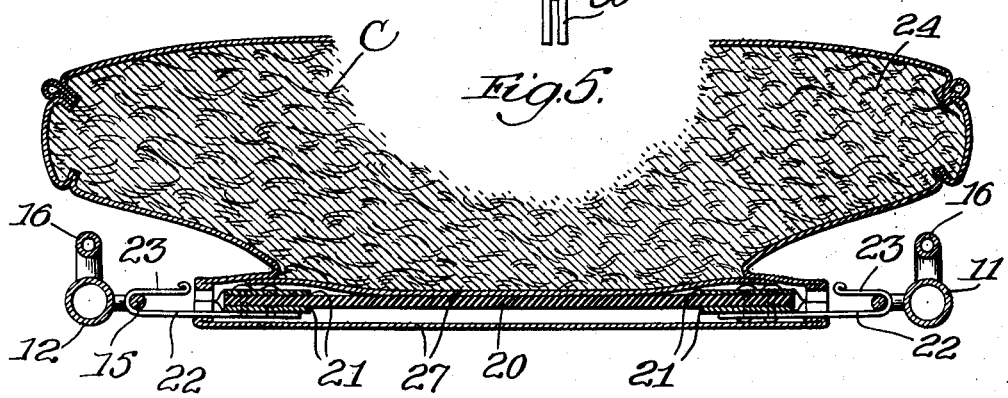
Inventors
Ernie J. Beck 3rd
William B. Schroeder
By Dyrenforth, Lee, Chritton & Wiles
Attys Patented Dec. 14, 1937

2,102,351

UNITED STATES PATENT OFFICE 2,102,351

SEAT BACK

Ernie J. Beck and William B. Schroeder, Chicago, Ill., assignors, by mesne assignments, to S. Karpen & Bros., a corporation of Illinois Application May 22, 1935, Serial No. 22,844

10 Claims. (Cl. 155—178)

This invention relates to a seat back which is adapted for use in buses, railway cars, aeroplanes, and in combination with metal furniture for various uses.

An object of the invention is to provide a seat back, the frame of which may be conveniently formed of metal, which affords a resilient cushion support. A further object is to provide a seat back frame of metal tubing or the like to which a seat back cushion may be securely attached and resiliently supported. Other specific objects and advantages will appear as the specification proceeds.

The invention is illustrated, in a preferred embodiment, by the accompanying drawings, in which—

Figure 1 is a rear view in elevation of a seat back embodying my invention; Fig. 2, a side view in elevation; Fig. 3, a sectional view showing only the parts at the line of section, the section being taken as indicated at line 3 of Figs. 1 and 2; Fig. 4, a rear view in elevation of the metal frame equipped only with a resilient sheet; and Fig. 5, a sectional view of the seat frame and cushion parts, the section being taken as indicated at the line 5 of Fig. 4.

In the illustration given, A designates a metal frame; B, a resilient back support; and C, a cushion body secured to the frame.

The frame A may be of any suitable construction. In the illustration given, we provide a tubing body 10 in the shape of a yoke, the vertical sides 11 and 12 thereof diverging slightly as they approach their lower limits. Each of the legs 11 and 12 is provided with inwardly turned flanges 13 to which is bolted a bottom frame member 14. To the tubing walls 11 and 12, we prefer to weld metal loops 15. To the front sides of the bars 11 and 12, we prefer to weld brace bars 16 which taper forwardly to a point near their bottoms and then curve inwardly at 17, as shown more clearly in Fig. 2. The bars 16 not only serve as a support for the cushion body C, but also provide a space between them and the tubing 11 in which tubular bearings 18 may be secured by welding or other suitable means. The yoke member 10 is provided near its upper end with a connecting tubular strap 19, the ends of which are welded to the sides 11 and 12. The member 19 is preferably extended rearwardly to permit the cushion C to swing rearwardly while also providing a convenient rack for coats, blankets, etc.

The resilient support B may also be of any suitable construction. We prefer to provide a thin resilient sheet of rubber or other suitable material which will occupy very little space within the metal frame. The rubber sheet 20 may be formed in the shape illustrated in Fig. 4, and the edge portions thereof reinforced with canvas strips 21 or any other suitable means. If desired, the strips 21 may be cemented to the rubber. To the reinforced borders of strip 20 are riveted metal straps 22. The straps on their outer ends are preferably turned to form hooks 23 engaging the metal loops 15 of the yoke 10.

After the frame A and resilient body B have been formed as illustrated in Fig. 4, we secure the cushion body C thereto. The cushion body C may be of any suitable construction. In the illustration given, a main cushion body 24 is formed and above such body is formed a head rest 25. Preferably, there is a narrowed section 26 between the rest 25 and body 24 which affords in substance a hinge connection between the two parts. To the back of the head rest 25 is secured a pair of fabric strips 27 which provide an envelope for receiving the rubber sheet 20. The fabric 27 is looped about the horizontal top bar of the yoke 10 so as to provide a firm connection. This connection is made conveniently by first reversing the back frame 10 upon the top bar as a pivot until the loop has been formed and connection made, and then swinging the back upon the same pivot to the position shown in Fig. 2. The depending fabric strips 27 are then passed around the rubber sheet 20 and the fabric strips secured together by rivets 28 on opposite sides of the metal straps 22. The strips are then extended about the lower frame bar 14 and secured to the bottom of the cushion body 24. If desired, a sturdy protector strip 29 may be secured to the lower portion of the fabric 27 to protect the fabric 27.

If desired, the side shaft 11 may be extended to provide a connection 30 to which a shifting lever of well known construction may be attached. Such an extension 30 is desirable if the seat back is used with a bus seat or the like.

In the operation, the resilient sheet 20 with its hinge connections 22 permits a yielding rearwardly of the cushion 24 when the chair, to which the back is attached, is occupied. At the same time, the forwardly extending brace bars 16 engage the sides of the cushion body 24, as shown more clearly in Fig. 2, so that the cushion yields more in its central portion. The pressing rearwardly of the main body cushion 24 causes the head cushion 25, which is anchored to the upper bar of yoke 10, to tilt forwardly, thus providing a raised pillow. With the construction shown, when the seat is in vertical position and less weight is placed against the resilient sheet 20, the head rest 25 is substantially in vertical alignment with the body 24. However, when the back is moved more to reclining position and greater weight is placed upon the yielding sheet 20, the head rest 25 is tilted forwardly to provide a raised pillow.

The cushion C is permanently secured to the metal frame by the looping of the backing material 27 as illustrated, around the top horizontal bar of yoke 10, and also by the extension of the back fabric 27 along the back wall of the frame and around the lower bar 14 where it is secured to the bottom of the front cushion member 24. The extension of the connections 22 and the resilient sheet 20 between the fabrics of the backing 27 also serves to tie the cushion C securely in position.

In mounting the back for pivotal movement on a seat frame, a pivot bar is passed through the tubular bearings 18 which are supported between side walls 11 and brace bars 16.

The foregoing detailed description has been given for clearness of understanding only, and no unnecessary limitations should be understood therefrom, but the appended claims should be construed as broadly as permissible, in view of the prior art.

We claim:

1. A seat back comprising: a substantially rectangular frame having spaced vertical bars equipped with attachment loops, non-elastic straps hingedly engaging said loops, and an elastic sheet centrally located within said frame and secured to the inner ends of said straps.

2. A seat back comprising: a frame affording vertical spaced bars, non-elastic straps hingedly connected to said bars, an elastic sheet centrally located within said frame and secured to the inner ends of said straps, and a covering for said elastic sheet.

3. A seat back comprising a metal frame having substantially vertical side bars, metal straps hingedly secured to said side bars in spaced relation, an elastic sheet centrally located within said frame and secured to the inner ends of said straps, and a flexible envelope about said sheet and provided with lateral openings through which said straps extend.

4. A seat back comprising: a substantially rectangular frame, straps hingedly secured to said frame in spaced relation, an elastic sheet secured to the inner ends of said strap, a cushion member on one side of said frame, and a backing member on the opposite side of said frame, said backing member being secured to the top and bottom portion of said cushion member, said backing member providing a cover for said flexible elastic sheet.

5. A seat back comprising: a substantially rectangular frame, straps hingedly secured to said frame in spaced relation, an elastic sheet secured to the inner ends of said strap, a cushion member on one side of said frame, and a backing member on the opposite side of said frame, said backing member being looped about the top portion of said frame and providing a cover for said elastic sheet.

6. A seat back comprising: a metal frame of general rectangular shape, a cushion member on one side of said frame, a backing member secured to the top and bottom of said cushion member, and extending about the back of said frame, said backing member being formed of two-ply fabrics, straps hingedly connected to the sides of said frame and supported in spaced relation, and a resilient sheet secured to the inner ends of said strap and housed between said fabric plies, said fabric plies being riveted together on each side of said straps to provide openings through which said straps extend.

7. A seat back comprising: a yoke shaped metal frame, forwardly extending brace bars having their sides secured to said frame, a cushion member secured to said frame and having its side portions pressed outwardly by said brace bars, and tubular bearings supported between said brace bars and said frame sides.

8. A seat back comprising: a frame having two spaced side members, brace bars secured to said side members and extending forwardly to provide a space therebetween, tubular bearings supported in the space between said brace bars and sides near the lower ends of said brace bars, and a cushion member secured to said frame and having its lower portions engaged by said brace bars.

9. A seat back comprising: a frame having at least two spaced side bars, brace bars secured to the front portions of said side bars and having portions thereof bowed forwardly to provide a space between them and the side bars, and tubular bearings secured within said openings between said brace bars and side bars.

10. A seat back comprising: a frame having upper and lower horizontal members, a cushion member including a main cushion body and a head rest thereabove, a yielding support carried by said frame behind said cushion body, said main cushion body being secured to said lower frame member and connected with said head rest at a flexible joint, said head rest being tiltably supported by said upper frame member, and said main cushion body and yielding support being so arranged that said main cushion body may be pressed against said yielding support to cause said head rest to be tilted forwardly.

ERNIE J. BECK.
WILLIAM B. SCHROEDER.